US009981698B2

(12) United States Patent
Maier (10) Patent No.: US 9,981,698 B2
(45) Date of Patent: May 29, 2018

(54) VEHICLE TUNNEL FLOOR STRUCTURE (71) Applicant: Thunder Power New Energy Vehicle Development Company Limited, Central (HK)

(72) Inventor: Jens Maier, Milan (IT)

(73) Assignee: THUNDER POWER NEW ENERGY VEHICLE DEVELOPMENT COMPANY LIMITED, Central (HK)

(*) Notice: Subject to any disclaimer, the term of this patent is extended or adjusted under 35 U.S.C. 154(b) by 0 days. days.

(21) Appl. No.: 15/690,664

(22) Filed: Aug. 30, 2017

(65) Prior Publication Data
US 2018/0065686 A1 Mar. 8, 2018

Related U.S. Application Data (60) Provisional application No. 62/384,298, filed on Sep. 7, 2016.

(51) Int. Cl.
B60N 99/00 (2006.01)
B62D 25/20 (2006.01)
B62D 27/02 (2006.01)
B62D 21/15 (2006.01)
B62D 21/03 (2006.01)

(52) U.S. Cl.
CPC ....... B62D 25/2018 (2013.01); B62D 27/026 (2013.01); B62D 21/03 (2013.01); B62D 21/15 (2013.01)

(58) Field of Classification Search
CPC .. B62D 25/2018; B62D 27/026; B62D 21/03; B62D 21/15
See application file for complete search history.

(56) References Cited

U.S. PATENT DOCUMENTS

| 9,550,530 | B2* | 1/2017 | Kawaguchi | B62D 21/02 |
| 2006/0061143 | A1* | 3/2006 | Okana | B62D 21/10 296/204 |
| 2009/0001766 | A1 | 1/2009 | Kurata | |
| 2014/0284965 | A1 | 9/2014 | Mildner | |

(Continued)

FOREIGN PATENT DOCUMENTS

DE 10 2014 007749 A1 12/2014
EP 0 554 889 A1 8/1993

(Continued)

OTHER PUBLICATIONS

European Search Report for EP17189820 dated Dec. 20, 2017, all pages.

Primary Examiner — Lori L Lyjak
(74) Attorney, Agent, or Firm — Kilpatrick Townsend & Stockton LLP (57) ABSTRACT A tunnel structure in an electric vehicle for providing a protected battery storage location and for increasing the stiffness of a vehicle's body structure. The tunnel structure may include a floor portion coupled to the floor of the vehicle, a front portion coupled to the vehicle firewall, and a paneled portion extending between the front portion and the floor portion. The tunnel structure may also include a plurality of panels and ridges that extend from the front portion toward a rear edge of the floor portion. The specific arrangement of the panels and ridges can improve the transfer of energy in the event of a collision.

18 Claims, 8 Drawing Sheets (56) References Cited

U.S. PATENT DOCUMENTS

| | | | |
|---|---|---|---|
| 2015/0232127 A1* | 8/2015 | Atsumi | B62D 25/20 296/187.08 |
| 2016/0052561 A1* | 2/2016 | Atsumi | B62D 25/2045 296/187.08 |
| 2016/0068196 A1* | 3/2016 | Saeki | B62D 21/157 296/187.08 |

FOREIGN PATENT DOCUMENTS

| | | |
|---|---|---|
| EP | 3 037 187 A1 | 6/2016 |
| FR | 2 915 452 A1 | 10/2008 |
| GB | 2 489 548 A | 10/2012 |
| WO | 2013/032213 A2 | 3/2013 |

* cited by examiner

VEHICLE TUNNEL FLOOR STRUCTURE

PRIORITY CLAIM

This Application claims priority to U.S. Provisional Application No. 62/384,298, entitled ELECTRIC VEHICLE COMPONENTS, filed on Sep. 7, 2016, which is hereby incorporated by reference in its entirety for all purposes.

BACKGROUND OF THE INVENTION

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

In a first embodiment of the present disclosure, an electric vehicle is provided. The electric vehicle may include a floor structure being substantially parallel to a base of the electric vehicle. The electric vehicle may include a front structure coupled to the floor structure. The front structure may form an angle with the floor structure. The electric vehicle may include a front cross member disposed on the floor structure. The electric vehicle may include a tunnel structure. The tunnel structure may include a floor portion coupled to the floor structure and the front cross member. The tunnel structure may include a front portion coupled to the front structure. The tunnel structure may include a paneled portion extending between the front portion and the floor portion. The paneled portion may include one or more substantially planar panels. Each of the one or more panels may extend from the front portion toward a rear edge of the floor portion.

In some embodiments, the electric vehicle includes a rear cross member disposed on the floor structure. The front cross member and the rear cross member may be parallel to each other and both may be perpendicular to a longitudinal direction of the electric vehicle. The floor portion of the tunnel structure may be coupled to the rear cross member. The floor portion of the tunnel structure may include a rear flange that interfaces with the rear cross member. The front portion of the tunnel structure may include a front flange that interfaces with the front structure. Each of the one or more panels may be planar. The floor structure and the front structure may be substantially perpendicular to each other. The tunnel structure may be hollow. Components of the electric vehicle may be coupled via adhesive. The paneled portion may include one or more ridges extending from the front portion toward the rear edge of the floor portion.

In a second embodiment of the present disclosure, a tunnel structure for placement in an electric vehicle is provided. The tunnel structure may include a floor portion coupled to a floor structure and a front cross member. The floor structure may be substantially parallel to a base of the electric vehicle. The front cross member may be disposed on the floor structure. The tunnel structure may include a front portion coupled to a front structure. The front structure may be coupled to the floor structure. The front structure may form an angle with the floor structure. The tunnel structure may include a paneled portion extending between the front portion and the floor portion. The paneled portion may include one or more substantially planar panels. Each of the one or more panels may extend from the front portion toward a rear edge of the floor portion.

In some embodiments, a rear cross member may be disposed on the floor structure. The front cross member and the rear cross member may be parallel to each other and both may be perpendicular to a longitudinal direction of the electric vehicle. The floor portion of the tunnel structure may be coupled to the rear cross member. The floor portion of the tunnel structure may include a rear flange that interfaces with the rear cross member. The front portion of the tunnel structure may include a front flange that interfaces with the front structure. Each of the one or more panels may be planar. The floor structure and the front structure may be substantially perpendicular to each other. The tunnel structure may be hollow. Components of the electric vehicle may be coupled via adhesive. The paneled portion may include one or more ridges extending from the front portion toward the rear edge of the floor portion.

In a third embodiment of the present disclosure, a method for receiving an impact force related to a vehicle collision is provided. The method may include receiving, by the front structure, a force related to the impact force. The method may include transferring a first portion of the force received by the front structure to the front portion. The method may include transferring a second portion of the force received by the front portion to the paneled portion. The method may include transferring a third portion of the force received by the paneled portion to the bottom portion. The method may include transferring a fourth portion of the force received by the bottom portion to the front cross member. The method may include transferring the fourth portion of the force received by the bottom portion to the front cross member and the rear cross member.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Embodiments of the present disclosure relate to a tunnel structure coupled to a floor of an electric vehicle. The tunnel structure provides several benefits to the vehicle in terms of both safety and performance, including, but not limited to: (1) increased stiffness for the vehicle's body structure, (2) increased efficiency of transfer of energy/force stemming from a head-on or angled impact to the vehicle's cross members and body structure, lessening the potential impact applied to users of the vehicle, (3) increased efficiency of transfer of energy/force stemming from an impact from a longitudinal direction to a downward vertical direction, and (4) increased protection and accommodation of the electric vehicle's battery. In some embodiments, the tunnel structure includes numerous diagonal panels and/or ridges that extend from a front portion of the tunnel structure toward one or more cross members of the vehicle. The specific arrangement of the panels and ridges within the tunnel structure may improve the transfer of energy in the event of a collision, and may contribute to the level of stiffness of the vehicle's body structure.

In some embodiments, the tunnel structure provides a hollow enclosure for placement of a vehicle battery. In electric vehicles, an increased emphasis is placed on protection of the electric battery as damage to battery cells can cause explosion and fires within the vehicle. The problem is compounded due to the large amount of space batteries must occupy within electric vehicles in order to maintain practical driving ranges. Therefore, battery storage locations away from the exterior of the electric vehicle are advantageous. Because the tunnel structure is situated at a relatively central location within the vehicle, it provides an additional protective measure against battery damage. The tunnel structure is particularly suitable for electric vehicles as they lack a drivetrain with a drive shaft that extends in the longitudinal direction along the center of the vehicle. The presence of a drive shaft in internal combustion vehicles may limit the number of locations in which the tunnel structure may be situated.

Figure 1:
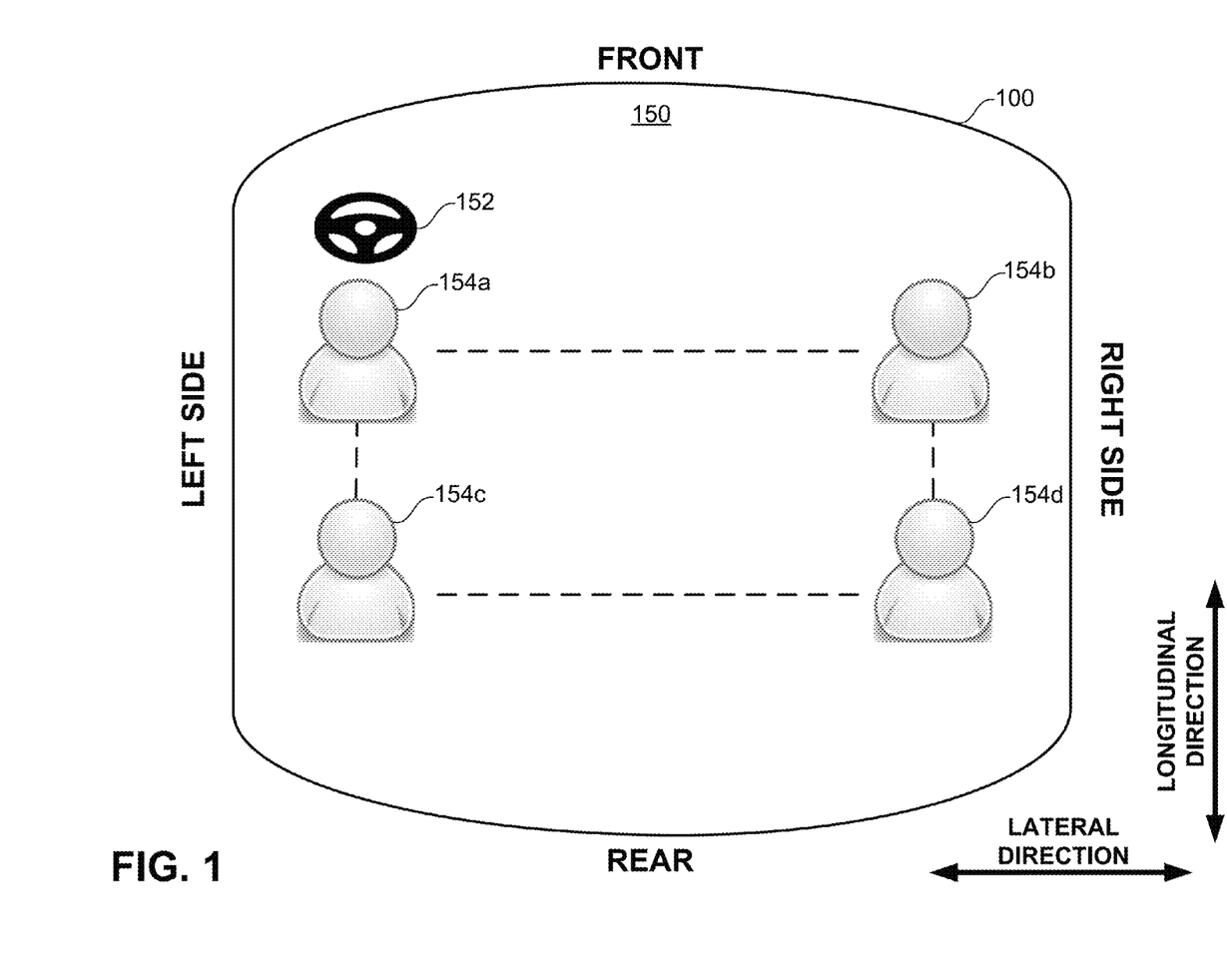
FIG. 1 illustrates a generalized transportation apparatus, according to an embodiment of the present disclosure.

FIG. 1 illustrates a generalized transportation apparatus 100, according to an embodiment of the present disclosure. Transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a helicopter, a spaceship, or any other type of aircraft; or may include any other transportation apparatus. In some embodiments, transportation apparatus 100 is an electrical automobile. As shown, transportation apparatus 100 may include a cabin 150 with a volume.

As shown in FIG. 1, transportation apparatus 100 may comprise one or more steering wheels 152 in cabin 150. Although only one steering wheel 152 is shown in FIG. 1, this is not intended to be limiting. In some examples, transportation apparatus 100 may include more than one steering wheel 152. For example, it is contemplated that transportation apparatus 100 may be an aircraft that comprises at least a main steering wheel 152 for the main pilot and at least a secondary steering wheel 152 for a co-pilot.

As also shown in FIG. 1, one or more users 154 may be arranged to occupy their corresponding positions in cabin 150. Users 154 may include one or more drivers that control the movement or navigation of transportation apparatus 100, one or more passengers, and/or any other type of users 154. In this example, user 154a is a driver that controls the driving of transportation apparatus 100, while other users 154, e.g., users 154b-d, are passengers. As still shown, there may be multiple rows of users 154 within cabin 150 of transportation apparatus 100.

Figure 2:
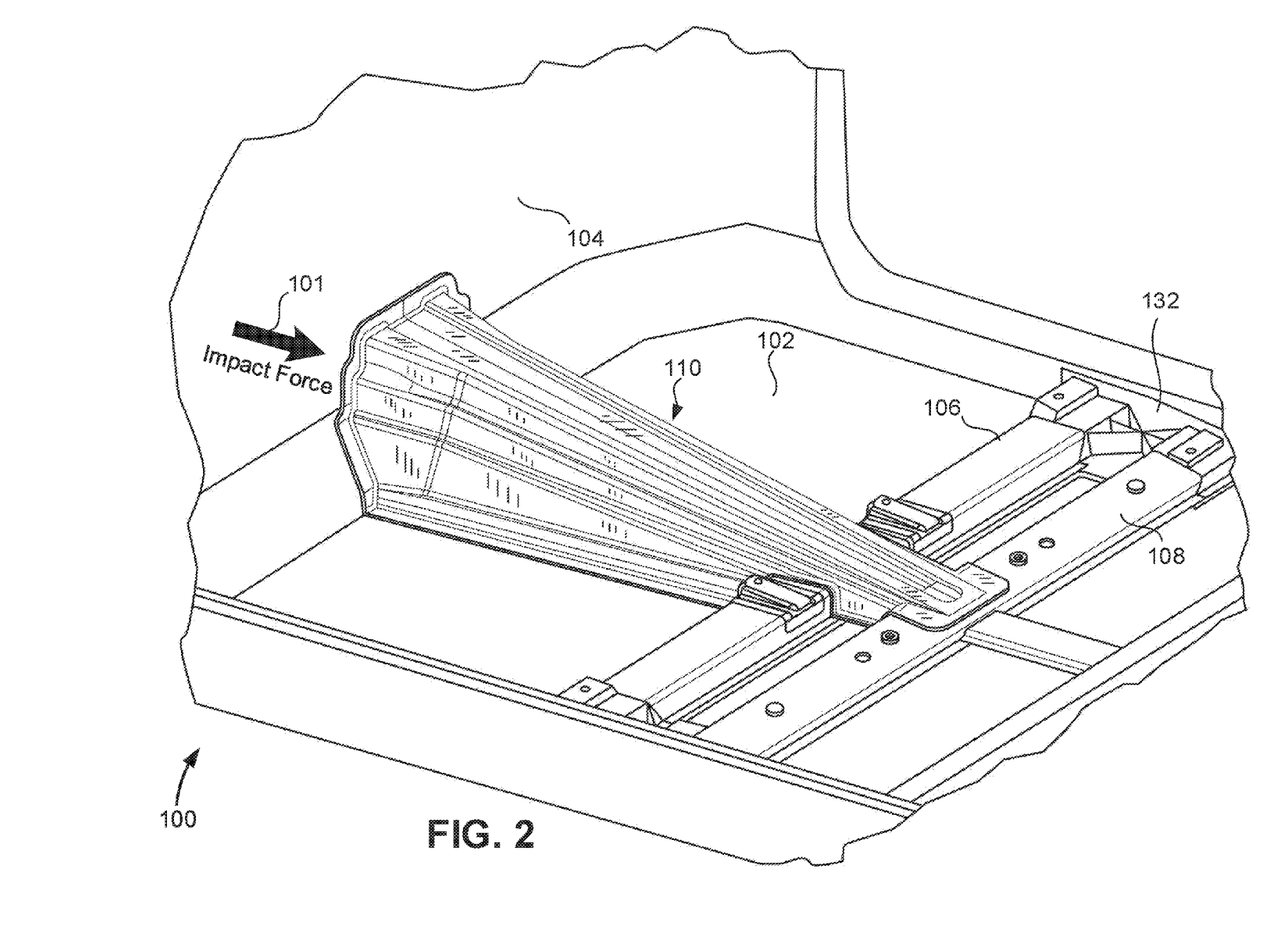
FIG. 2 illustrates a perspective view of an electric vehicle, according to an embodiment of the present disclosure.

FIG. 2 illustrates a perspective view of an electric vehicle 100 utilizing a tunnel structure 110, according to an embodiment of the present disclosure. Although the tunnel structure 110 is shown in FIG. 2 as being situated in an electric vehicle, in other embodiments the tunnel structure 110 may be implemented in any of the transportation apparatus described in reference to FIG. 1. In some embodiments, the electric vehicle 100 further includes a floor structure 102, a front structure 104, a front cross member 106, a rear cross member 108, and a side chassis 132.

In some embodiments, the floor structure 102 is substantially parallel to a base of the electric vehicle 100. The base of the electric vehicle 100 may be any of the following: the bottom surface of the electric vehicle 100, the base plate of the electric vehicle 100, the roof of the electric vehicle 100, an imaginary surface connecting the four wheels of the electric vehicle 100, an imaginary surface parallel with the ground beneath the electric vehicle 100, and the like. In some embodiments, the floor structure 102 is the same as or is integrated with the body structure or base plate of the electric vehicle 100. The floor structure 102 may be planar or may be substantially planar.

In some embodiments, the front structure 104 is coupled to the floor structure 102 and forms an angle with the floor structure 102, including 90 degrees (perpendicular), 60 degrees, 45 degrees, 30 degrees, and the like. The front structure 104 may be the same as the vehicle firewall, and may separate the vehicle cabin 150 from the rest of the vehicle in the frontward direction. The front structure 104 may be coupled with the vehicle's crash beams (not shown), which are often on of the primary means for lessening the effects of a front collision. Therefore, in the event of a head-on collision, the front structure 104 may be subject to considerable force in the longitudinal direction.

In some embodiments, the front cross member 106 is disposed on the floor structure 102. The front cross member 106 may be coupled to the side chassis 132 on both the left side and right side of the vehicle, and may be coupled to the body structure and floor structure 102 along the bottom side of the front cross member 106. In some embodiments, the rear cross member 108 is disposed on the floor structure 102 and is similarly coupled to the side chassis 132 on both the left side and right side of the vehicle. The front cross member 106 and the rear cross member 108 may be parallel to each other and may be perpendicular to the longitudinal direction of the vehicle, and may be composed of one or more of a number of different materials such as steel, aluminum, carbon fiber, and the like. In some embodiments, the front cross member 106 and the rear cross member 108 are integrated with the body structure of the electric vehicle 100 such that the combination appears and functions as one continuous member. The front cross member 106 may serve as an anchor for the front row seats of the vehicle and the rear cross member 108 may serve as an anchor for the back row seats of the vehicle. In some embodiments, both the front cross member 106 and the rear cross member 108 serve as anchors for the front row seats of the vehicle.

In some embodiments, the tunnel structure 110 is disposed at least partially on the floor structure 102 and is coupled to the floor structure 102, the front structure 104, the front cross member 106, and the rear cross member 108. However, the tunnel structure 110 need not be coupled to both the front cross member 106 and the rear cross member 108, and may instead be coupled to one of the two. The tunnel structure 110 may include surfaces that extend diagonally from the front structure 104 to the floor structure 102, and may exhibit a somewhat triangular or conical shape. In some embodiments, the tunnel structure 110 is hollow and provides an enclosure for placement of a vehicle battery (not shown). The tunnel structure 110 may be composed of one or more of a number of different materials such as steel, aluminum, carbon fiber, and the like.

Figure 3:
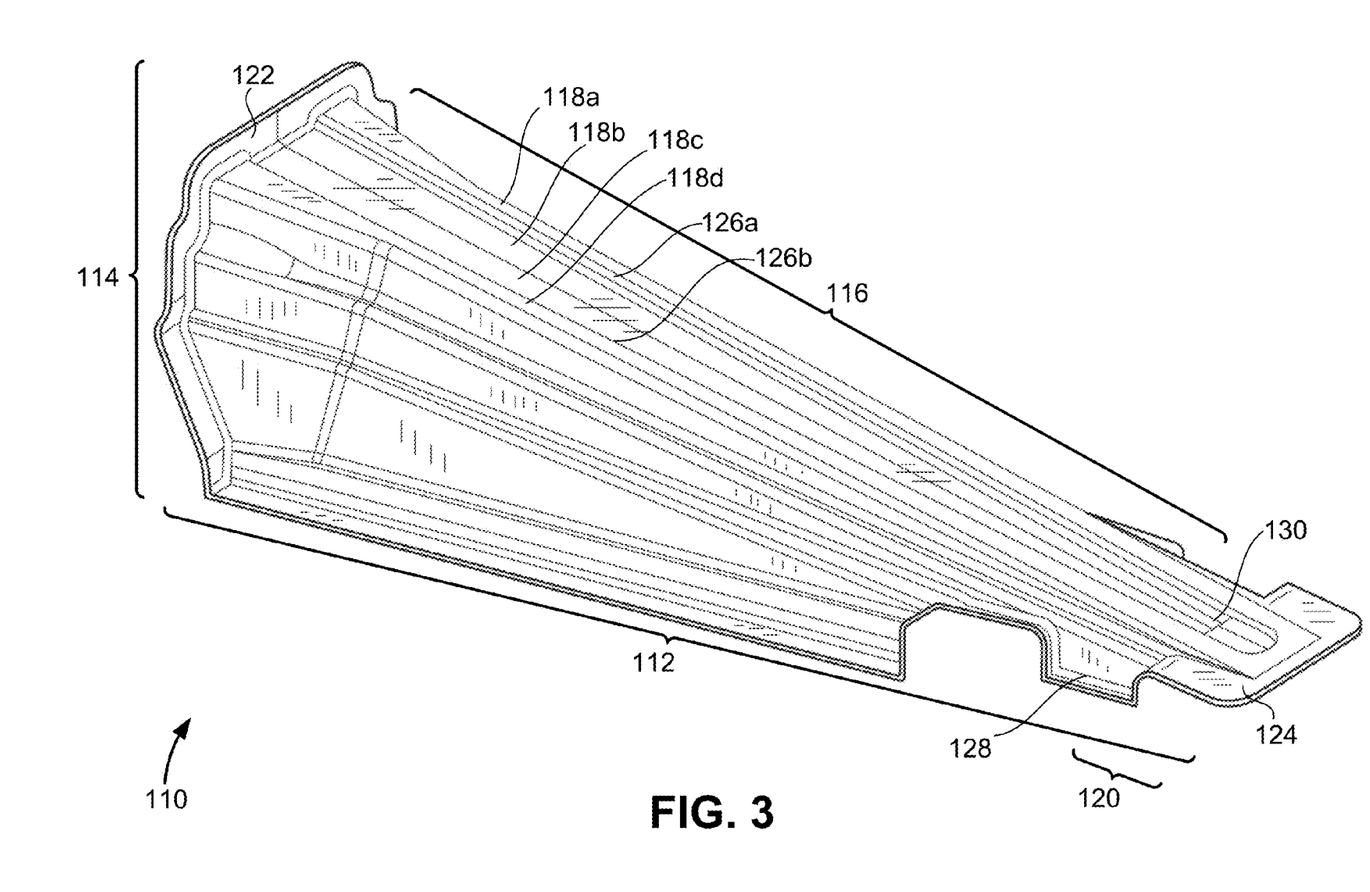
FIG. 3 illustrates a perspective view of a tunnel structure, according to an embodiment of the present disclosure.

FIG. 3 illustrates a perspective view of the tunnel structure 110, according to an embodiment of the present disclosure. The tunnel structure 110 may include a floor portion 112 along the bottom of the tunnel structure 110 that interfaces with and couples to the floor structure 102, the front cross member 106, and the rear cross member 108. The tunnel structure 110 may also include a front portion 114 along the front of the tunnel structure 110 that interfaces with and couples to the front structure 104. The front portion 114 may include a front flange 122 that extends outward normal to the longitudinal direction. The front flange 122 may be coupled to the front structure 104 via an adhesive or other means of coupling. The floor portion 112 may include a rear flange 124 that extends outward normal to the vertical direction and couples to the rear cross member 108 via an adhesive or other means of coupling. The tunnel structure 110 may include other regions with flanges, such as along the floor portion 112, to further increase the stability and stiffness of the tunnel structure 110 and of the vehicle's body structure.

In some embodiments, the tunnel structure 110 includes a paneled portion 116 that extends between the front portion 114 and the floor portion 112. The paneled portion 116 may include one or more panels 118 that extend from the front portion 114 toward a rear edge 120 of the floor portion 112. The one or more panels 118 may be planar or curved, and may take on a number of different shapes. The paneled portion 116 may also include one or more ridges 126 that similarly extend from the front portion 114 toward a rear edge 120, and may separate the one or more panels 118. The one or more ridges 126 may be concave, convex, pointed, right angles, acute angles, obtuse angles, and the like. The one or more panels 118 and the one or more ridges 126 may not extend completely from the front portion 114 all the way to the rear edge 120. For example, in some embodiments, a panel or a ridge may extend half way, 25% of the way, or 75% of the way from the front portion 114 to the rear edge 120. In some embodiments, the specific shape and arrangement of the one or more panels 118 and the one or more ridges 120 may improve the transfer of energy in the event of a vehicle collision and may contribute to the level of stiffness of the vehicle's body structure. Furthermore, the shape of the paneled portion 116 may improve these features and also provide an adequate enclosure for an electric battery.

Figure 4:
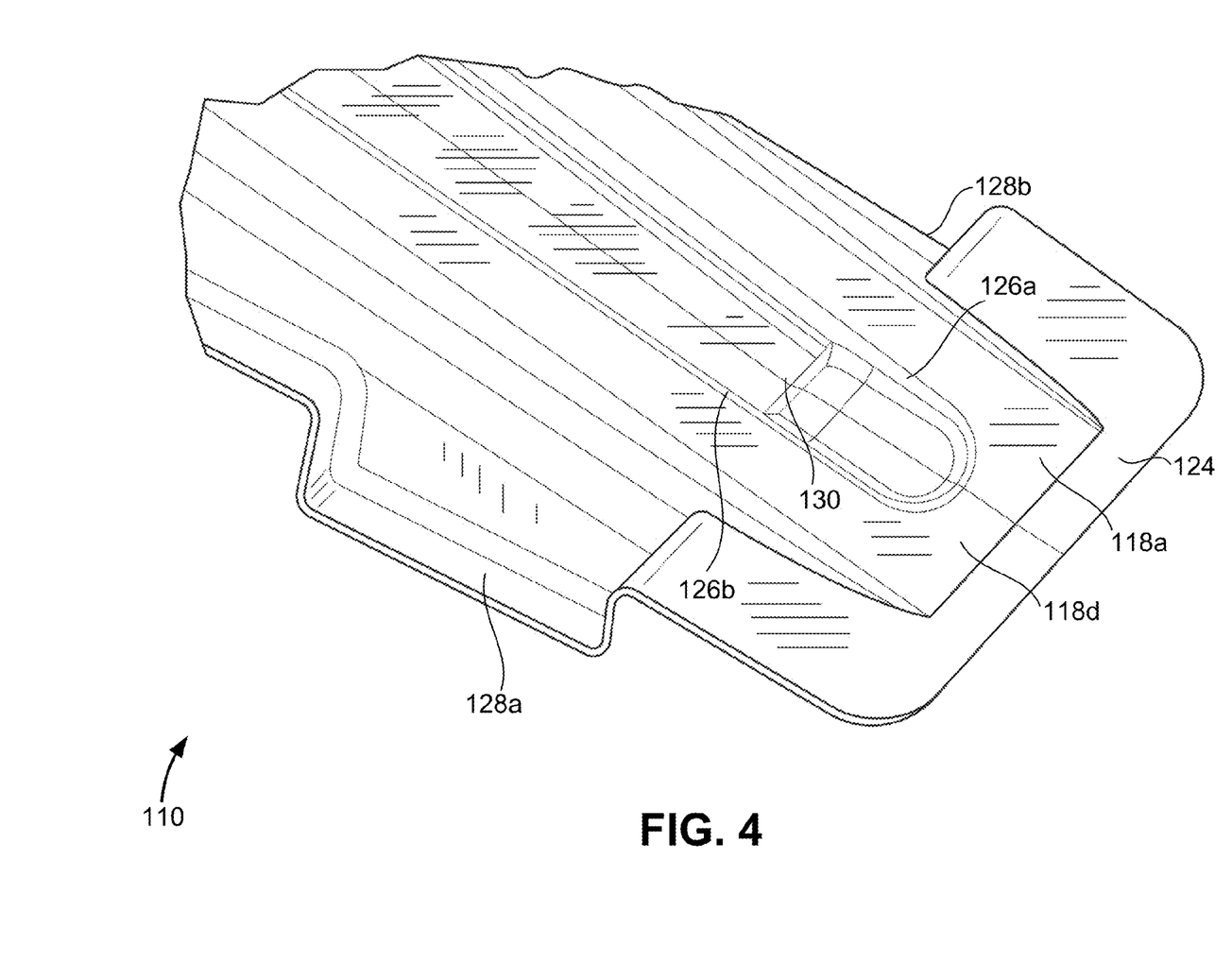
FIG. 4 illustrates a perspective view of a tunnel structure, according to an embodiment of the present disclosure.

FIG. 4 illustrates a zoomed-in perspective view of the tunnel structure 110, according to an embodiment of the present disclosure. Panels 118a and 118d may connect around panels 118b and 118c such that ridges 126a and 126b are connected in a half circle, separating the two groups of panels, as shown in FIG. 4. In addition, the tunnel structure 110 may include outer anchor portions 128a and 128b and an inner anchor portion 130 which extend downward in the vertical direction between the front cross member 106 and the rear cross member 108. The inner anchor portion 130 may be formed by bending panels 118b and 118c around the location where the panels align with a forward edge of the rear cross member 108. The outer anchor portions 128a and 128b may be formed by bending panels 118a and 118d around the location where the panels align with a rearward edge of the front cross member 106 and around the location where the panels align with a forward edge of the rear cross member 108. As such, panels 118a and 118d are planar and panels 118b and 118c are substantially planar. This configuration exhibits a greater energy transfer efficiency to the rear cross member 108 in the event of a collision than several other possible configurations.

In some embodiments, the rear flange 124 extends outward normal to the vertical direction. The rear flange 124 may be configured such that it extends outward in the longitudinal direction until aligning with a rearward edge of the rear cross member 108. A high energy transfer efficiency is maintained where the rear flange 124 extends further in the lateral direction than in the longitudinal direction, as is shown in FIG. 4. In some embodiments, a high energy transfer efficiency is achieved where the rear flange 124 extends in the lateral direction twice as far as the rear flange 124 extends in the longitudinal direction, while also providing that the rear flange 124 extends in the longitudinal direction by at least 15 mm.

Figure 5:
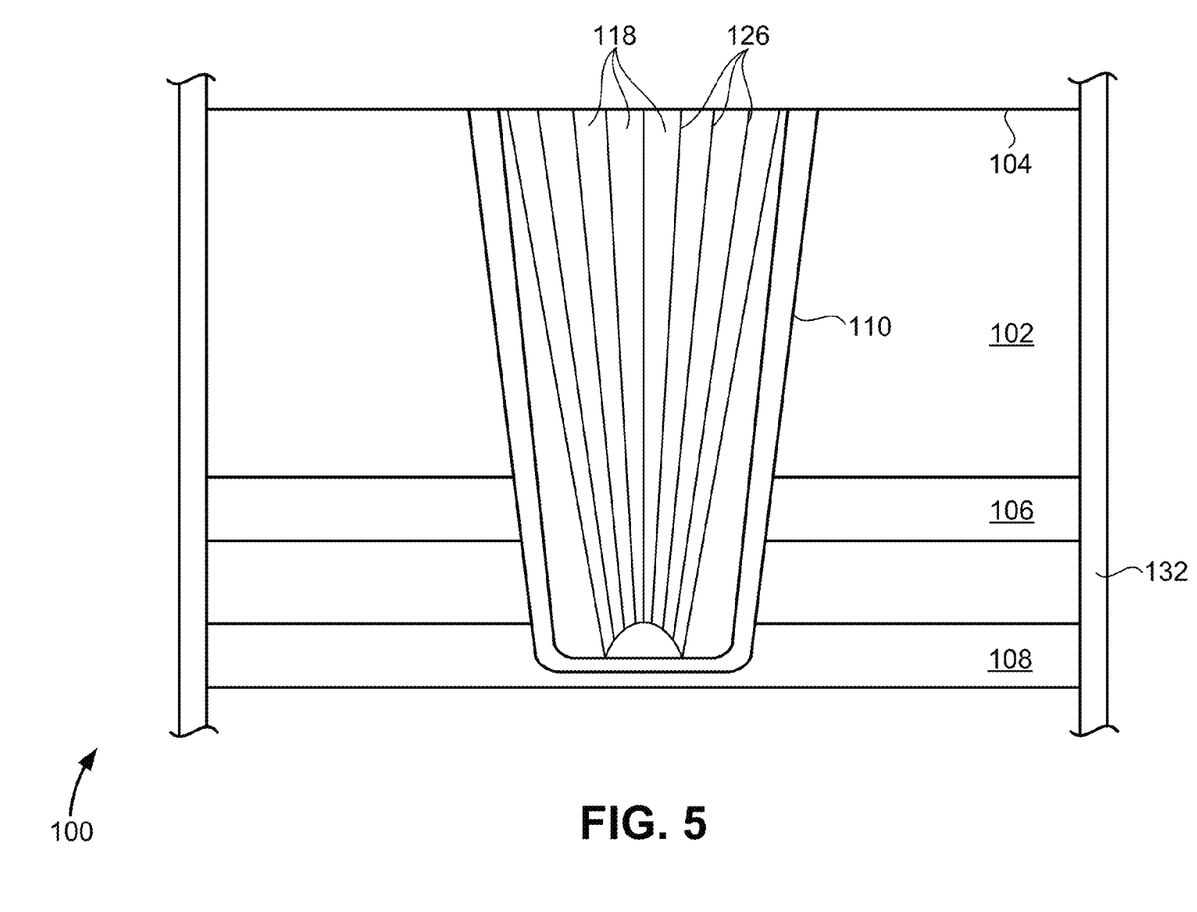
FIG. 5 illustrates a top view of an electric vehicle, according to an embodiment of the present disclosure.
Figure 6:
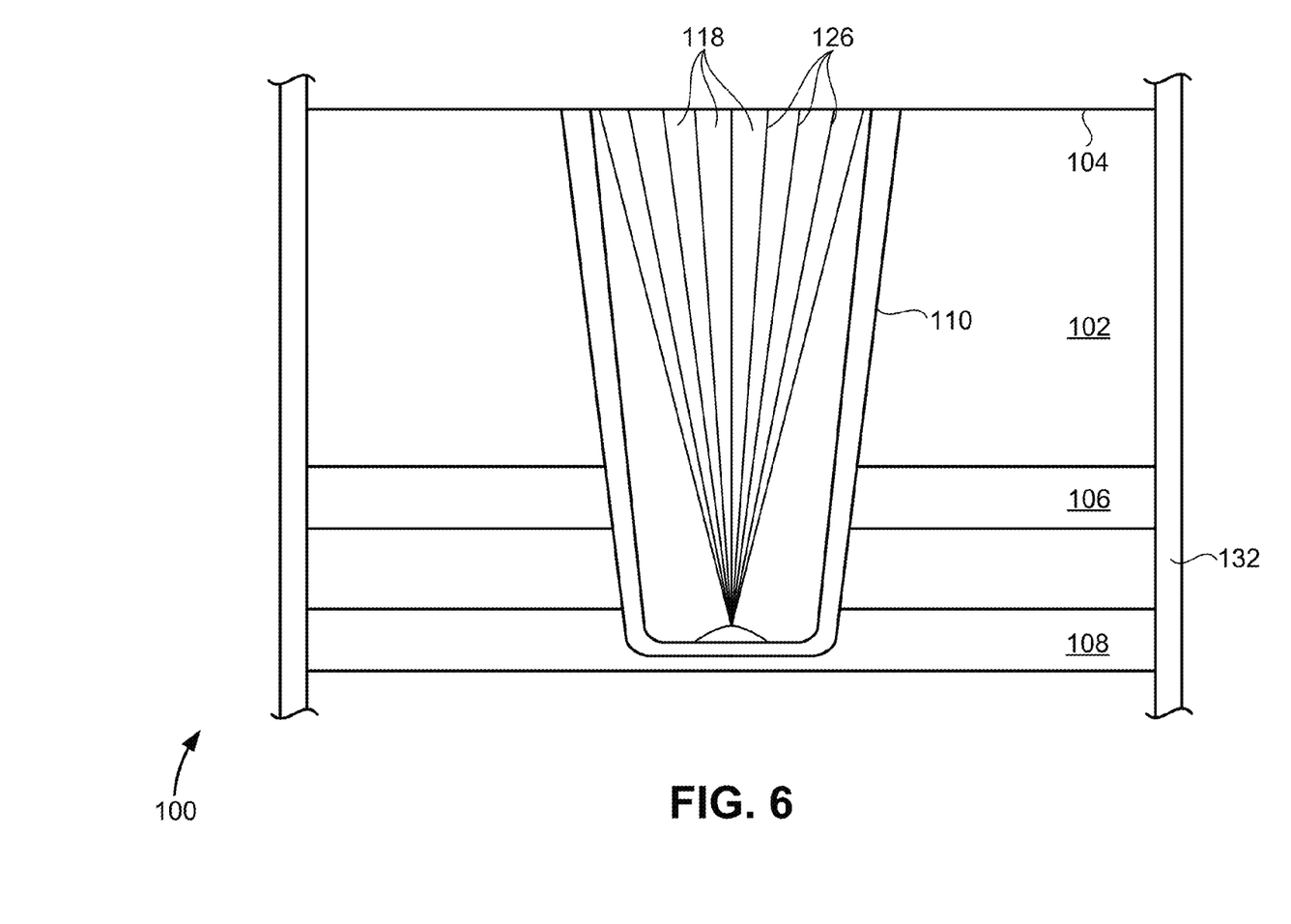
FIG. 6 illustrates a top view of an electric vehicle, according to an embodiment of the present disclosure.
Figure 7:
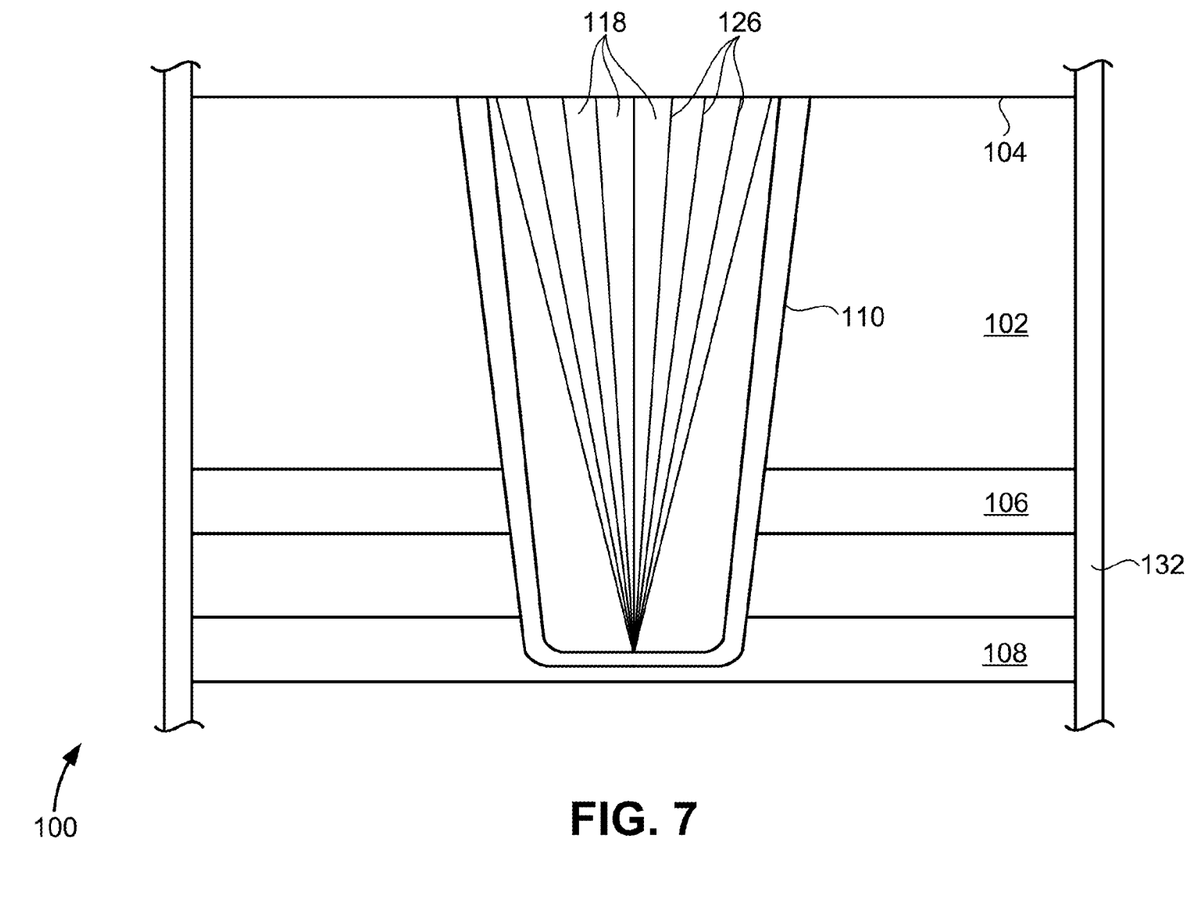
FIG. 7 illustrates a top view of an electric vehicle, according to an embodiment of the present disclosure.

FIGS. 5-7 illustrate top views of the electric vehicle 100 in which various configurations of the tunnel structure 110 are employed. Each of the configurations shown exhibit various levels of performance, safety, cost, and volume constraints. In FIGS. 6 and 7, the one or more panels 118 are triangular and the one or more ridges 126 are linear, which may increase the energy transfer efficiency through the tunnel structure at the cost of the energy being received by the rear cross member 108 at a more concentrated location. In contrast, in FIG. 5 the transfer of energy through the tunnel structure 110 may be less efficient, but the energy being received by the rear cross member 108 may be more spread.

Figure 8:
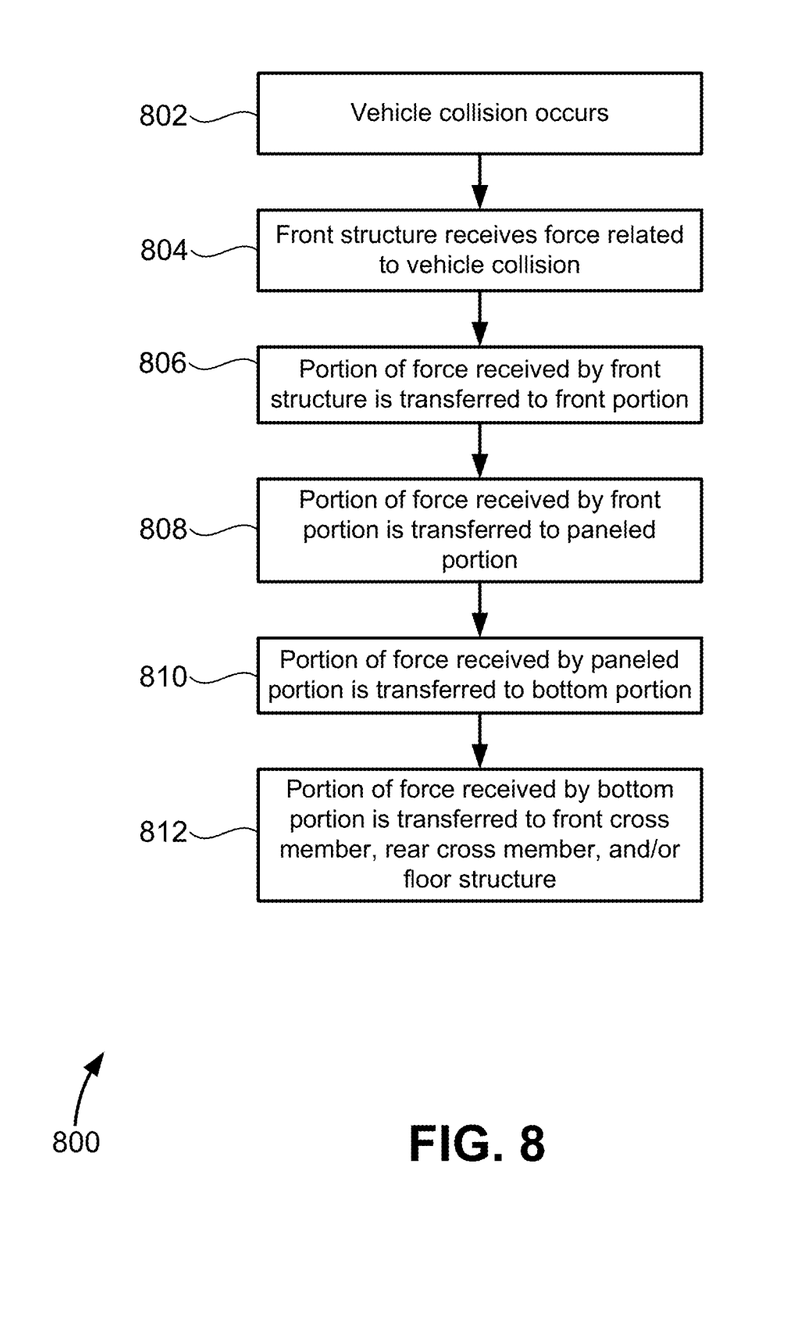
FIG. 8 illustrates a method for receiving an impact force related to a vehicle collision, according to an embodiment of the present disclosure.

FIG. 8 illustrates a method 800 for receiving an impact force 101 related to a vehicle collision, according to an embodiment of the present disclosure. At step 802, a vehicle collision occurs. The collision may be a head-on (front) or angled impact, or an impact from some other direction. At step 804, the front structure 104 receives a force related to the impact force 101. At step 806, a first portion of the force received by the front structure 104 is transferred to the front portion 114. At step 808, a second portion of the force received by the front portion 114 is transferred to the paneled portion 116. At step 810, a third portion of the force received by the paneled portion 116 is transferred to the bottom portion 112. At step 812, a fourth portion of the force received by the bottom portion 112 is transferred to the front cross member 108, the rear cross member 108, and/or the floor structure 102.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

LIST OF TERMS

100—Electric Vehicle / Transportation Apparatus
101—Impact Force
102—Floor Structure
104—Front Structure
106—Front Cross Member
108—Rear Cross Member
110—Tunnel Structure
112—Floor Portion (of Tunnel Structure)
114—Front Portion (of Tunnel Structure)
116—Paneled Portion (of Tunnel Structure)
118a-d—One or More Panels
120—Rear Edge (of Floor Portion)
122—Front Flange (of Floor Portion)
124—Rear Flange (of Front Portion)
126a-b—One or More Ridges
128—Outer Anchor Portion (of Tunnel Structure)
130—Inner Anchor Portion (of Tunnel Structure)
132—Side Chassis
150—Cabin
152—Steering Wheel
154a-d—Users

What is claimed is:

1. An electric vehicle comprising:
    a floor structure;
    a front structure coupled to the floor structure, the front structure forming an angle with the floor structure;
    a front cross member disposed on the floor structure; and
    a tunnel structure comprising:
        a floor portion coupled to the floor structure and the front cross member;
        a front portion coupled to the front structure; and
        a paneled portion extending between the front portion and the floor portion, the paneled portion including one or more substantially planar panels, wherein each of the one or more panels extend from the front portion toward a rear edge of the floor portion.

2. The electric vehicle of claim 1, further comprising:
    a rear cross member disposed on the floor structure, wherein the front cross member and the rear cross member are parallel to each other and are both perpendicular to a longitudinal direction of the electric vehicle, and wherein the floor portion of the tunnel structure is coupled to the rear cross member.

3. The electric vehicle of claim 2, wherein the floor portion of the tunnel structure includes a rear flange that interfaces with the rear cross member.

4. The electric vehicle of claim 1, wherein the front portion of the tunnel structure includes a front flange that interfaces with the front structure.

5. The electric vehicle of claim 1, wherein each of the one or more panels is planar.

6. The electric vehicle of claim 1, wherein the floor structure and the front structure are substantially perpendicular to each other.

7. The electric vehicle of claim 1, wherein the tunnel structure is hollow.

8. The electric vehicle of claim 1, wherein the paneled portion includes one or more ridges extending from the front portion toward the rear edge of the floor portion.

9. A tunnel structure for placement in an electric vehicle, the tunnel structure comprising:
- a floor portion coupled to a floor structure and a front cross member, wherein the front cross member is disposed on the floor structure;
- a front portion coupled to a front structure, wherein the front structure is coupled to the floor structure, and wherein the front structure forms an angle with the floor structure; and
- a paneled portion extending between the front portion and the floor portion, the paneled portion including one or more substantially planar panels, wherein each of the one or more panels extend from the front portion toward a rear edge of the floor portion.

10. The tunnel structure of claim 9, wherein a rear cross member is disposed on the floor structure, wherein the front cross member and the rear cross member are parallel to each other and are both perpendicular to a longitudinal direction of the electric vehicle, and wherein the floor portion of the tunnel structure is coupled to the rear cross member.

11. The tunnel structure of claim 10, wherein the floor portion of the tunnel structure includes a rear flange that interfaces with the rear cross member.

12. The tunnel structure of claim 9, wherein the front portion of the tunnel structure includes a front flange that interfaces with the front structure.

13. The tunnel structure of claim 9, wherein each of the one or more panels is planar.

14. The tunnel structure of claim 9, wherein the floor structure and the front structure are substantially perpendicular to each other.

15. The tunnel structure of claim 9, wherein the tunnel structure is hollow.

16. The tunnel structure of claim 9, wherein the paneled portion includes one or more ridges extending from the front portion toward the rear edge of the floor portion.

17. A method for receiving an impact force related to a vehicle collision, the method comprising:
for an electric vehicle comprising:
- a floor structure;
- a front structure coupled to the floor structure, the front structure forming an angle with the floor structure;
- a front cross member disposed on the floor structure; and
- a tunnel structure comprising:
  - a floor portion coupled to the floor structure and the front cross member;
  - a front portion coupled to the front structure; and
  - a paneled portion extending between the front portion and the floor portion, the paneled portion including one or more substantially planar panels, wherein each of the one or more panels extend from the front portion toward a rear edge of the floor portion;

receiving, by the front structure, a force related to the impact force;
transferring a first portion of the force received by the front structure to the front portion;
transferring a second portion of the force received by the front portion to the paneled portion;
transferring a third portion of the force received by the paneled portion to the bottom portion; and
transferring a fourth portion of the force received by the bottom portion to the front cross member.

18. The method of claim 17, further comprising:
transferring the fourth portion of the force received by the bottom portion to the front cross member and the rear cross member.

* * * * *